(12) United States Patent
Shepherd et al.

(10) Patent No.: US 12,351,743 B2
(45) Date of Patent: Jul. 8, 2025

(54) TIE COAT

(71) Applicant: ADVANCED INNERGY LTD, Gloucester (GB)

(72) Inventors: Simon Harry Shepherd, Gloucester (GB); Alastair Boyes, Gloucester (GB)

(73) Assignee: ADVANCED INNERGY LTD, Gloucester (GB)

( * ) Notice: Subject to any disclaimer, the term of this patent is extended or adjusted under 35 U.S.C. 154(b) by 690 days.

(21) Appl. No.: 17/059,892

(22) PCT Filed: Jun. 6, 2019

(86) PCT No.: PCT/GB2019/051569
§ 371 (c)(1),
(2) Date: Nov. 30, 2020

(87) PCT Pub. No.: WO2019/234431
PCT Pub. Date: Dec. 12, 2019

(65) Prior Publication Data
US 2021/0122957 A1    Apr. 29, 2021

(30) Foreign Application Priority Data

Jun. 6, 2018 (GB) .................................. 1809305

(51) Int. Cl.
| | |
|---|---|
| *C09J 183/04* | (2006.01) |
| *C08G 77/12* | (2006.01) |
| *C08G 77/20* | (2006.01) |
| *C09D 5/00* | (2006.01) |
| *C09D 183/04* | (2006.01) |

(52) U.S. Cl.
CPC ............ *C09J 183/04* (2013.01); *C08G 77/12* (2013.01); *C08G 77/20* (2013.01); *C09D 5/002* (2013.01); *C09D 183/04* (2013.01)

(58) Field of Classification Search
CPC .................. C09J 183/04; C09J 2203/00; C09J 2483/00; C08G 77/12; C08G 77/20; C09D 5/002; C09D 183/04; C08L 83/00; C08K 5/56
See application file for complete search history.

(56) References Cited

U.S. PATENT DOCUMENTS

| | | | | |
|---|---|---|---|---|
| 3,284,406 A * | 11/1966 | Nelson | ............... | C08L 83/04 524/588 |
| 4,472,563 A * | 9/1984 | Chandra | ............... | C08L 83/04 528/31 |
| 4,766,176 A * | 8/1988 | Lee | ............... | C08J 3/241 528/31 |
| 4,774,297 A | 9/1988 | Murakami et al. | | |
| 4,861,670 A * | 8/1989 | Lampe | ............... | C09D 183/04 428/447 |
| 5,248,739 A | 9/1993 | Schmidt et al. | | |
| 5,373,078 A * | 12/1994 | Juen | ............... | C08L 83/04 525/478 |
| 5,654,251 A * | 8/1997 | Abbott | ............... | B01J 31/0222 502/224 |
| 5,755,866 A * | 5/1998 | Bayly | ............... | C09J 5/02 106/287.16 |
| 2004/0214727 A1* | 10/2004 | Janoff | ............... | C08K 7/28 507/233 |
| 2006/0014858 A1* | 1/2006 | Takano | ............... | C09C 1/644 523/204 |
| 2007/0059535 A1 | 3/2007 | Nakamura | | |
| 2008/0242807 A1 | 10/2008 | Aoki | | |
| 2009/0305036 A1 | 12/2009 | Aoki | | |
| 2011/0212333 A1* | 9/2011 | Maliverney | ............... | C09D 5/1693 428/447 |
| 2012/0135514 A1 | 5/2012 | Muller-Rees et al. | | |
| 2013/0122314 A1* | 5/2013 | Ou | ............... | A61L 31/14 427/2.12 |
| 2020/0231834 A1* | 7/2020 | Izumi | ............... | C09D 7/65 |

FOREIGN PATENT DOCUMENTS

| | | | |
|---|---|---|---|
| EP | 2423289 A1 | | 2/2012 |
| EP | 2817145 B1 | | 4/2020 |
| JP | 2006160923 A | | 6/2006 |
| JP | 2012041504 A | | 3/2012 |
| KR | 101548484 B1 | | 8/2015 |
| WO | WO 2012/091167 A2 | * | 7/2012 |
| WO | WO-2013/178982 A1 | | 12/2013 |
| WO | WO-2013/178992 A1 | | 12/2013 |

OTHER PUBLICATIONS

Examination Report, issued in the UK Intellectual Property Office for GB Patent Application No. GB1809305.4, dated Mar. 14, 2022.
Examination Report, issued in the UK Intellectual Property Office for GB Patent Application No. GB1809305.4, dated Oct. 28, 2022.
International Search Report and Written Opinion, corresponding International Application No. PCT/GB2019/051569, mailing date Aug. 21, 2019.
Search Report, issued in the UK Intellectual Property Office for GB Patent Application No. GB1809305.4, dated May 24, 2019.
Examination Report, issued in the EP Patent Office for EP Patent Application No. 19730504.8, dated Jun. 1, 2023.

\* cited by examiner

*Primary Examiner* — Cynthia L Schaller
(74) *Attorney, Agent, or Firm* — MARSHALL, GERSTEIN & BORUN LLP

(57) ABSTRACT

A silicone tie coat for bonding thermal insulation material to a substrate useable subsea. The silicone tie coat is the reaction product of a mixture comprising polydiorganosiloxane polymer and an organohydrogensiloxane crosslinker, wherein the reaction is catalyzed by a metallic catalyst. The silicone tie coat has a thickness of at least about 20 μm.

17 Claims, No Drawings

TIE COAT

CROSS REFERENCE TO RELATED APPLICATIONS

The present application is the U.S. national phase of International Application No. PCT/GB2019/051569 filed Jun. 6, 2019, which claims priority from Application No. 1809305.4 filed Jun. 6, 2018 in the United Kingdom. The entire contents of these applications are incorporated herein by reference in their entireties.

TECHNOLOGICAL FIELD

Examples of the disclosure relate to a tie coat and particularly a silicone tie coat, a method of bonding thermal insulation material to a substrate useable subsea, a thermal insulation structure for a substrate useable subsea, and a thermally insulated substrate useable subsea.

BACKGROUND

It is often necessary to provide thermal insulation for substrates useable subsea, such as may be used in hydrocarbon facilities. In such instances it is required to provide a bond between the substrate and the thermal insulation material which will be strong and long lasting in the harsh operating conditions experienced subsea.

There is a requirement therefore to provide tie coat structures which securely bond thermal insulation material to a substrate useable subsea, wherein the bond formed will be strong and long lasting in the harsh operating conditions experienced subsea.

All proportions referred to in this specification are indicated as weight % (wt/%).

BRIEF SUMMARY

According to various, but not necessarily all, examples of the disclosure there is provided a silicone tie coat for bonding thermal insulation material to a substrate useable subsea, wherein the silicone tie coat is the reaction product of a mixture comprising polydiorganosiloxane polymer and an organohydrogensiloxane crosslinker, the reaction being catalyzed by a metallic catalyst, wherein the silicone tie coat has a thickness of at least about 20 μm.

The silicone tie coat may have a thickness of about 20 μm to about 250 μm, and more particularly the silicone tie coat may have a thickness of about 20 μm to about 80 μm.

The polydiorganosiloxane polymer may comprise polymethylvinyl siloxane. The organohydrogensiloxane crosslinker may comprise polymethylhydro siloxane.

The metallic catalyst may be a platinum catalyst. The platinum catalyst may comprise an organoplatinum catalyst. The organoplatinum catalyst may comprise platinum divinyl tetramethyl disiloxane or cyclovinyl methyl siloxane complex.

The thermal insulation material may comprise a silicone thermal insulation material.

According to various, but not necessarily all, examples of the disclosure there is provided a method of bonding thermal insulation material to a substrate useable subsea, the method comprising applying a silicone tie coat to the substrate to a thickness of at least 20 μm, the silicone tie coat being the reaction product of a mixture comprising polydiorganosiloxane polymer and an organohydrogensiloxane crosslinker, the reaction being catalyzed by a metallic catalyst, the method further comprising bonding thermal insulation material to the silicone tie coat.

The method may comprise adjusting the amount of metallic catalyst to control the reaction rate.

The reaction may require an organic solvent, wherein the method may comprise adjusting the amount of organic solvent to control the reaction rate.

According to various, but not necessarily all, examples of the disclosure there is provided a thermal insulation structure for a substrate useable subsea, the thermal insulation structure comprising a silicone tie coat bonded to thermal insulation material, wherein the silicone tie coat is the reaction product of a mixture comprising polydiorganosiloxane polymer and an organohydrogensiloxane crosslinker, the reaction being catalyzed by a metallic catalyst, wherein the silicone tie coat has a thickness of at least about 20 μm.

According to various, but not necessarily all, examples of the disclosure there is provided a thermally insulated substrate useable subsea, the thermally insulated substrate comprising a silicone tie coat bonded to the substrate and thermal insulation material bonded to the silicone tie coat, the silicone tie coat providing a layer between the substrate and the thermal insulation material, wherein the silicone tie coat is the reaction product of a mixture comprising polydiorganosiloxane polymer and an organohydrogensiloxane crosslinker, the reaction being catalyzed by a metallic catalyst, wherein the silicone tie coat has a thickness of at least about 20 μm.

According to various, but not necessarily all, examples of the disclosure there may be provided examples as claimed in the appended claims.

BRIEF DESCRIPTION

For a better understanding of various examples that are useful for understanding the detailed description, reference will now be made by way of example only.

DETAILED DESCRIPTION

Examples of the disclosure provide a silicone tie coat for bonding thermal insulation material to a substrate useable subsea, and in particular for bonding silicone thermal insulation material to a substrate useable subsea.

The term 'substrate' covers subsea equipment useable subsea, and also thermal insulation material. Substrates useable subsea comprise, for example, subsea equipment as may be used in hydrocarbon facilities. Items of subsea equipment which benefit from thermal insulation include: wellheads and Xmas trees, spool pieces, manifolds, risers, pipelines and pipeline field joints. In such applications, the thermal insulation maintains the temperature of the extracted fluids as they pass through portions of the equipment exposed to the cooling effects of sea water.

When the substrate is subsea equipment, the subsea equipment may comprise any suitable material. For instance, the subsea equipment may be an epoxy phenolic coated metallic substrate, an epoxy substrate, a metallic substrate, such as steel, or a polypropylene, polyurethane or dicyclopentadiene substrate, or polymer based fibre reinforced composite.

When the substrate is thermal insulation material, the thermal insulation material may comprise, for example, polyolefin based thermal insulation material, phenolic based thermal insulation material, epoxy modified olefin based thermal insulation material, or other silicone based thermal insulation material.

Accordingly, in some examples the silicone tie coat may be bonded directly to subsea equipment. Subsequently, a thermal insulation layer, for example a silicone thermal insulation material, would then be bonded to the silicone tie coat layer. The surface of the subsea equipment may have been modified prior to application of the silicone tie coat, for instance, by plasma treatment, flame ionisation, chemical etching or shot blasting, or by an anticorrosive coating, for example, being applied.

In other examples, the silicone tie coat may be bonded to a thermal insulation layer on subsea equipment. In such examples, the thermal insulation layer would therefore be the 'substrate'. Subsequently, a further thermal insulation material, for example a silicone thermal insulation material, would then be bonded to the silicone tie coat layer. The resultant structure would therefore comprise two thermal insulation layers bonded together by the silicone tie coat. The two thermal insulation layers may comprise the same or different materials. In such structures, a further tie coat may bond a one of the thermal insulation layers to the subsea equipment. The further tie coat may be a silicone tie coat according to examples of the disclosure. A structure comprising more than two layers of thermal insulation may be provided, for example, a structure may comprise a first layer of thermal insulation bonded to a second layer of thermal insulation by a silicone tie coat, and a third layer of thermal insulation bonded to the second layer of thermal insulation by a further silicone tie coat. The silicone tie coat may be according to examples of the disclosure.

The silicone tie coat is the reaction product of a mixture comprising a polydiorganosiloxane polymer and an organohydrogensiloxane crosslinker. The reaction is catalyzed by a metallic catalyst.

The silicone tie coat has a thickness of at least about 20 μm (micrometer). Accordingly, the silicone tie coat is not a crystalline brittle molecular film.

The silicone tie coat forms a layer on the substrate. The layer formed has a thickness of at least about 20 μm.

Examples of the disclosure also provide a method of bonding thermal insulation material to a substrate useable subsea. The method comprises applying a silicone tie coat to the substrate to a thickness of at least 20 μm, and subsequently applying a thermal insulation material to the silicone tie coat.

Examples of the disclosure also provide a thermal insulation structure for a substrate useable subsea. The thermal insulation structure comprises a silicone tie coat bonded to a thermal insulation material. The silicone tie coat has a thickness of at least about 20 μm.

Examples of the disclosure also provide a thermally insulated substrate useable subsea. The thermally insulated substrate comprises a silicone tie coat bonded to the substrate and to thermal insulation material. The silicone tie coat provides a layer between the substrate and the thermal insulation material. The silicone tie coat has a thickness of at least about 20 μm.

In some examples, the silicone tie coat has a thickness of about 20 μm to about 250 μm, and more particularly has a thickness of about 20 μm to about 80 μm.

The relative thickness of the silicone tie coat provides flexibility since the coating is more elastomeric. Accordingly, the silicone tie coat is more resistant to in use fracturing or cracking. Further, the relative thickness of the silicone tie coat provides an in use damping effect in terms of any structural movement between the thermal insulation and substrate, for example, due to the differential between thermal expansion coefficients such as may be experienced where there is rapid cooling of equipment (blowdown) or physically applied stress. The risk of disbondment is therefore reduced.

The modulus of the silicone tie coat may be less than the modulus of the thermal insulation to further improve the damping effect.

Further, the relative thickness of the silicone tie coat reduces its susceptibility to particulate contamination which is problematic with thinner tie coat layers. Sensitivity to substrate surface preparation is therefore reduced.

The bonds formed between the substrate and silicone tie coat, and the silicone tie coat and the thermal insulation are therefore more robust, for example, in peel and pull off tests. Such bonds will therefore be stronger and longer lasting in the harsh operating conditions experienced subsea. Accordingly, the adhesion provided is robust and is not affected by the environmental conditions of the cure.

The silicone tie coat acts as an adhesive between the thermal insulation and the substrate.

Examples

Table 1 provides examples of reaction mixtures used to form a silicone tie coat according to examples of the disclosure. Table 1 indicates the specific component used, and in brackets the general term being used for that specific component.

TABLE 1

| Component | 1 (wt/%) | 2 (wt/%) | 3 (wt/%) | 4 (wt/%) | 5 (wt/%) |
|---|---|---|---|---|---|
| Isoheptane (solvent) | 68.95 | 68.95 | 69 | 69 | 77 |
| platinum divinyl tetramethyl disiloxane (metallic catalyst) | 0.04 | 0.04 | 0.003 | 0.003 | 0.003 |
| tetramethyl tetravinyl cyclotetrasiloxane (inhibitor) | 0.1 | 0.1 | 0.1 | 0.1 | 0.1 |
| Polydimethylsiloxane (carrier) | 1.84 | 1.84 | 0.797 | 0.797 | 0.797 |
| polymethylvinyl siloxane (polydiorganosiloxane polymer) | 24.36 | 14.43 | 16.7 | 22.5 | 17.6 |
| Polymethylhydro siloxane (organohydrogensiloxane crosslinker) | 1.61 | 11.54 | 13.3 | 7.5 | 4.4 |
| blue dye (dye) | 0.1 | 0.1 | 0.1 | 0.1 | 0.1 |
| additives | 3 | 3 | 0 | 0 | 0 |

Table 1 above provides details of five different reaction mixtures (reaction mixtures 1 to 5). The amounts of components indicated are weight %.

In the above specific examples, the reaction to form a silicone tie coat according to examples of the disclosure is initiated when polymethylvinyl siloxane, polymethylhydro siloxane and platinum catalyst are combined. In practice, the components of the reaction mixtures detailed in Table 1 above may be split across multiple parts prior to being mixed together. For example, polymethylvinyl siloxane and platinum catalyst may be provided in a first part and polymethylhydro siloxane, along with the remainder of the components, may be provided in a second part. The only limitation is that all of polymethylvinyl siloxane, polymethylhydro siloxane and platinum catalyst are not provided in a one of the parts. Accordingly, polymethylvinyl siloxane and polymethylhydro siloxane may be provided in the same part, provided the platinum catalyst is not provided in that part. The two parts can then be mixed together immediately prior to use.

In some examples a three-part system may be provided in which a one of the parts comprises catalysts.

The components and relative amounts thereof may be adjusted according to each specific application, for instance, to bond to different substrates.

Solvent

The solvent acts as a carrier and/or diluent. The solvent is volatile and is not therefore present in the silicone tie coat which is formed as the reaction product.

In some examples, the reaction mixture may also comprise dimethoxyethane (DME). In such examples the reaction mixture may comprise up to about 10 wt/% DME.

The reaction mixture to form the silicone tie coat may comprise between 50 wt/% and 90 wt/% solvent, and more particularly between 65 wt/% and 80 wt/% solvent.

Metallic Catalyst

The metallic catalyst facilitates an addition reaction between polydiorganosiloxane polymer and organohydrogensiloxane crosslinker. In the described examples the addition reaction is between polymethylvinyl siloxane and polymethylhydro siloxane. This process cures the reaction mixture to provide the silicone tie coat.

In some examples the metallic catalyst is a platinum group hydrosilylation catalyst present. The platinum catalyst may be, for example, platinum divinyl tetramethyl disiloxane or cyclovinyl methyl siloxane complex.

The metallic catalyst is present in an amount sufficient to effect curing of the reaction mixture. The amount of metallic catalyst provided in the reaction mixture may be adjusted to control the rate of curing.

The reaction mixture to form the silicone tie coat may comprise between 0.001 wt/% and 0.5 wt/% metallic catalyst, and more particularly between 0.001 wt/% and 0.005 wt/% metallic catalyst.

Inhibitor

The inhibitor acts to slow, and/or stabilise and/or regulate the reaction between polydiorganosiloxane polymer and organohydrogensiloxane crosslinker. The inhibitor may comprise tetramethyl tetravinyl cyclotetrasiloxane, or trimethyl trivinyl cyclotrisiloxane, or pentamethyl pentavinyl cyclopentasiloxane.

In some examples, the reaction mixture comprises a combination of the above inhibitors.

The reaction mixture to form the silicone tie coat may comprise between 0.001 wt/% and 2 wt/% inhibitor, and more particularly between 0.05 wt/% and 0.2 wt/% inhibitor.

Organohydrogensiloxane Crosslinker

In the described examples the organohydrogensiloxane crosslinker is polymethylhydrosiloxane. The organohydrogensiloxane crosslinker has a molecular weight of between about 200 to about 60,000, and more particularly between about 800 to about 25,000, and a viscosity between about 20 to about 8000 cP, and more particularly between about 20 to about 200 cP.

The reaction mixture to form the silicone tie coat may comprise between 1 wt/% and 15 wt/% organohydrogensiloxane crosslinker, and more particularly between 3 wt/% and 10 wt/% organohydrogensiloxane crosslinker.

Polydiorganosiloxane Polymer

In the described examples the polydiorganosiloxane polymer is polymethylvinyl siloxane. The polydiorganosiloxane polymer has a molecular weight between about 5000 to about 100,000, and more particularly between about 5000 to about 7000, and a viscosity between about 50 to about 40,000 cP, and more particularly about 100 to about 1,000 cP.

The reaction mixture to form the silicone tie coat may comprise between 10 wt/% and 30 wt/% polydiorganosiloxane polymer, and more particularly between 15 wt/% and 20 wt/% polydiorganosiloxane polymer.

Carrier

In the described examples polydimethylsiloxane (PDMS) is provided as a carrier for the platinum catalyst. PDMS has a viscosity of about 400 cP.

The reaction mixture to form the silicone tie coat may comprise between 0.5 wt/% and 10 wt/% carrier, and more particularly between 0.5 wt/% and 3 wt/% carrier.

Dye

In the described examples, a blue dye is provided as a visual aid to mixing and application of the silicone tie coat to a substrate.

The reaction mixture to form the silicone tie coat may comprise between 0.005 wt/% and 4 wt/% dye, and more particularly between 0.05 wt/% and 0.15 wt/% dye.

Additives

The additives may comprise, for example, adhesion promoters, wetting agents, dispersing agents, rheology modifiers, viscosity modifiers, and surfactants.

The reaction mixture to form the silicone tie coat may comprise between 0.001 wt/% and 4 wt/% additives, and more particularly between 0.5 wt/% and 3 wt/% additives.

Method

Examples of the disclosure also provide a method of bonding a thermal insulation material to a substrate useable subsea. The method comprising applying a silicone tie coat to the substrate to a thickness of at least 20 μm, and subsequently applying a thermal insulation material to the silicone tie coat.

In examples where the components of the reaction mixture to form the silicone tie coat are provided in two parts, the two parts are mixed together immediately before application to a substrate. The subsequent reaction mixture is then applied to a surface of a substrate, for example, by spraying, brushing, or rolling the reaction mixture onto the surface to provide a layer of silicone tie coat on the surface of the substrate. This may be a manual or automated process. The silicone tie coat is therefore a wet applied coating.

Thermal insulation, for example silicone thermal insulation, is subsequently applied to the silicone tie coat layer, for instance, by spraying, brushing or rolling a wet mixture which subsequently cures to provide a layer of thermal insulation. The thermal insulation may be syntactic. The resultant product is a thermally insulated substrate useable subsea.

In one example, the substrate is a pipeline useable subsea. The silicone tie coat is therefore applied directly to the surface of the pipeline. In another example, the substrate is a thermal insulation material, for instance a phenolic based thermal insulation material, which covers a pipeline useable subsea. The silicone tie coat is therefore applied directly to the surface of the thermal insulation.

The reaction mixture may cure at ambient temperature (5 to 40° C.). A relatively high level of metallic catalyst negates the need to heat cure the reaction mixture. The reaction mixture may be tailored to cure at different rates, for example, by varying the amount of catalyst and/or solvent present in the reaction mixture. Accordingly, the cure rate is adjustable and can be tailored to suit different applications. For example, a relative long cure rate may be appropriate for subsequent over moulding with silicone thermal insulation material.

If required, the rate of curing may be accelerated by heating the reaction mixture. The reaction mixture may be heated up to 150° C., for instance, by use of a heat gun. A relatively short cure rate may be appropriate for applications such as pipeline field joint coating.

The thickness of the silicone tie coat may be measured by a wet film comb immediately after application whilst the silicone tie coat is still wet, or a dry film gauge after the silicone tie coat has cured.

In some examples, the surface of the substrate may be modified prior to application of the silicone tie coat, for instance, by plasma treatment, flame ionisation, shot blasting or chemical etching.

There is thus described a silicone tie coat, a method of bonding thermal insulation material to a substrate useable subsea, a thermal insulation structure for a substrate useable subsea, and a thermally insulated substrate useable subsea, with a number of advantages as detailed above and as follows. Furthermore, the reaction mixture does not require a certain level of atmospheric moisture (humidity) to cure since a metallic catalyst is used to cure the reaction mixture to provide a silicone tie coat according to examples of the disclosure. The silicone tie coat according to examples of the disclosure can therefore be applied irrespective of the environmental conditions.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that features described with reference to one example but not with reference to another example, can where possible be used in that other example but does not necessarily have to be used in that other example.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of bonding thermal insulation material to a substrate useable subsea, the method comprising:
applying a silicone tie coat to the substrate, the silicone tie coat being a reaction product of a mixture comprising between 10 wt % to 30 wt % of a polydiorganosiloxane polymer, between 3 wt % to 15 wt % of an organohydrogensiloxane crosslinker, and between 65 wt % and 90 wt % of a solvent, the reaction being catalyzed by a metallic catalyst,
the method further comprising bonding thermal insulation material to the silicone tie coat, wherein the solvent is isoheptane.

2. A method according to claim 1, wherein the method comprises adjusting the amount of metallic catalyst to control the reaction rate.

3. A method according to claim 1, wherein the method comprises adjusting the amount of isoheptane to control the reaction rate.

4. A method according to claim 1, wherein the thermal insulation material comprises a silicone thermal insulation material.

5. A method according to claim 1, wherein the polydiorganosiloxane polymer comprises polymethylvinyl siloxane, and the mixture comprises between 15 wt % and 20 wt % polymethylvinyl siloxane and between 65 wt % and 80 wt % of isoheptane.

6. A method according to claim 1, wherein the organohydrogensiloxane crosslinker comprises polymethylhydrosiloxane.

7. A method according to claim 1, wherein the mixture comprises between 0.5 wt % and 3 wt % of polydimethylsiloxane, wherein the polydimethylsiloxane is different from the polydiorganosiloxane polymer.

8. A method according to claim 1, wherein the mixture comprises between 15 wt % and 20 wt % polydiorganosiloxane polymer.

9. A method according to claim 1, wherein the mixture comprises between 3 wt % and 10 wt % organohydrogensiloxane crosslinker.

10. A method according to claim 1, wherein the mixture comprises between 0.001 wt % and 2 wt % inhibitor.

11. A method according to claim 1, wherein the mixture comprises between 0.001 wt % and 4 wt % additives.

12. A method according to claim 1, wherein the polydiorganosiloxane polymer has a viscosity between 100 cP and 1000 cP.

13. A method according to claim 1, wherein the polydiorganosiloxane polymer has a molecular weight between 5000 and 7000.

14. A method according to claim 1, wherein the organohydrogensiloxane crosslinker has a viscosity between 20 cP and 8000 cP.

15. A method according to claim 1, wherein the metallic catalyst is a platinum catalyst.

16. A method according to claim 15, wherein the platinum catalyst comprises an organoplatinum catalyst.

17. A method according to claim 16, wherein the organoplatinum catalyst comprises platinum divinyl tetramethyl disiloxane or cyclovinyl methyl siloxane complex.

* * * * *